Jan. 3, 1933.    H. TONJES, JR    1,892,817
TRACTOR SCRAPER
Filed June 19, 1931    2 Sheets-Sheet 1

Inventor
Henry Tonjes Jr.
By Clarence A O'Brien
Attorney

Jan. 3, 1933. H. TONJES, JR 1,892,817
TRACTOR SCRAPER
Filed June 19, 1931 2 Sheets-Sheet 2

Inventor
Henry Tonjes Jr.
By Clarence A. O'Brien
Attorney

Patented Jan. 3, 1933

1,892,817

UNITED STATES PATENT OFFICE

HENRY TONJES, JR., OF WISNER, NEBRASKA

TRACTOR SCRAPER

Application filed June 19, 1931. Serial No. 545,594.

This invention relates generally to an improved and novel tractor wheel scraper, and particularly to a scraper of this type which may be attached to existing parts of the tractor and which is constructed to automatically trip and move out of operation upon striking an unusual obstruction on the tractor wheel, whereby to prevent bending or destruction of the scraper.

An object of this invention is to provide a simple and easily installed device of the character described which is not only simple and effective in operation, but which is low in cost of manufacture, and is not likely to get out of order.

It is also an object of this invention to provide a device of the character described which may be attached to an existing fender associated with a tractor wheel.

These and other objects of the invention, its nature, its composition, arrangement and combination of parts will be readily understood by anyone acquainted with the art to which this invention relates upon consulting the following description of the drawings in which.

Figure 1:
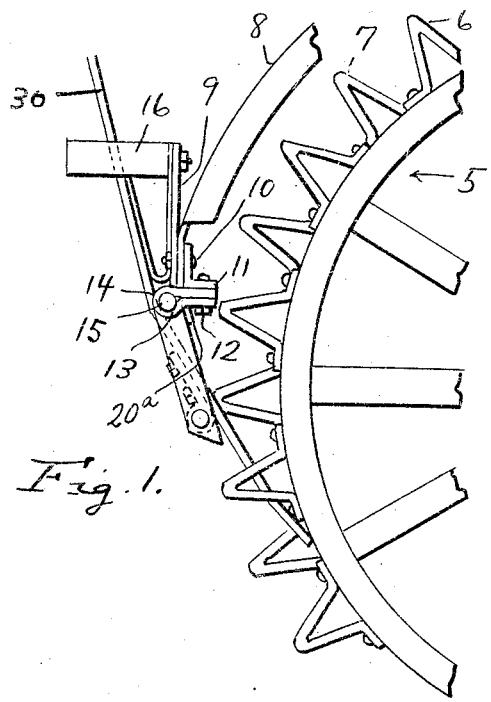
Figure 1 is a general side elevational view of the device of the invention shown in operative position associated with a tractor wheel.
Figure 2:
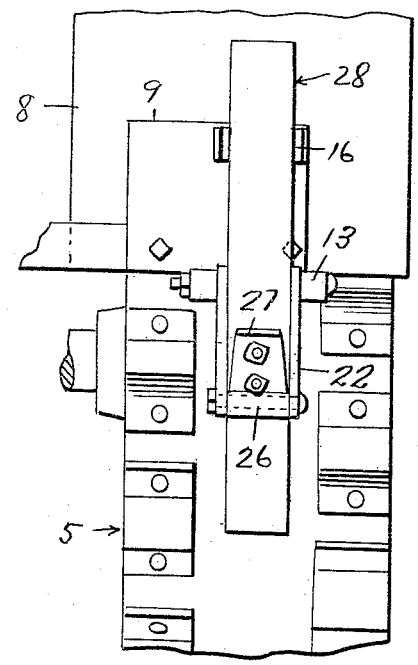
Figure 2 is an elevational view taken from the left of Figure 1.

Referring in detail to the drawings, the numeral 5 generally designates a conventional tractor drive wheel having the transversely spaced ground engaging members 6 and 7. Over the wheel in a conventional manner is disposed the fender 8, and to the lower fender brace or other rigid member of the fender 8 is secured an upstanding plate 9. To the back of the fender 8 and secured by the same means as indicated at 10 which secures the plate 9 is an angle bracket 11. Secured to the horizontal flange of the angle bracket by means of bolts or the like 12 is a horizontally disposed U-shaped hinge bracket 13 which has its bight expanded as at 14 to form a journal for a wooden hinge pin 15.

Figure 5:
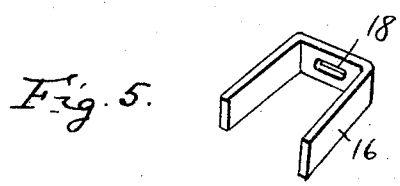
Figures 5, 6 and 7 are perspective details of the parts of the device of the invention.
Figure 6:
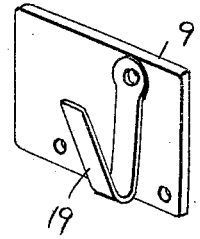

To the upper end of the plate 9 and extending rearwardly in a horizontal position is a spring in the form of a U-shaped bracket 16 secured by a bolt or the like 17 passing through the slot 18 therein and through the plate 9. Between the U-shaped bracket 16 and the plate 9 is secured by the securing means 17 a V-shaped spring 19 and disposed as shown in Figure 6 and the remaining figures of the drawings. The bracket 16 has its legs slightly diverging outwardly as shown in Fig. 5.

Figure 3:
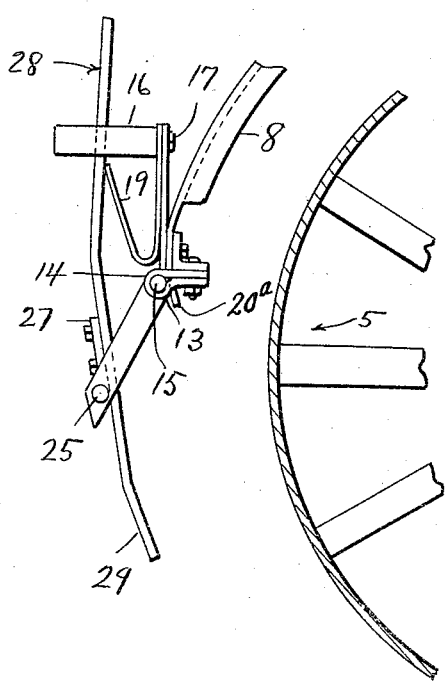
Figure 3 is a view similar to Figure 1 except that a cross section is taken through the wheel and the device is shown in inoperative position.
Figure 7:
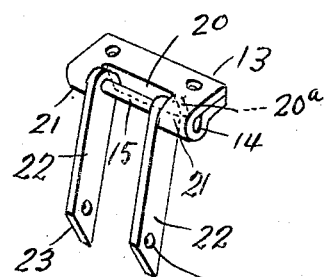

The hinge bracket 13 is cut away as seen in Figure 7 at 20, and between the portions 21 thus created, a pair of parallelly spaced arms 22 is carried on the pin 15. The lower ends of the arms 22 are angularly cut as indicated at 23, and provided with transverse holes 24 to receive an adjustable bolt 25 projected therethrough and through the elongated eye 26 of a pivot bracket 27 secured at a non-central portion upon the rearward face of the elongated scraper bar generally designated 28 which is adapted to be swung into a position to have its lower end portion 29 in scraping contact between the ground engaging members 6, 7 of the wheel 5, in which position the longer upper portion 30 thereof is in a rearward and upward position shown in Figure 1. In this position the upward end portion 30 is springedly and frictionally held between the arms of the U-shaped spring 16. The tension of the spring 19 positions the scraper bar 28 in either the wheel engaging position shown in Figure 1, or in the free and inoperative position shown in Figure 3. The depending tongue 20a on the portion 20 of the bracket 13 limits the swing of the arms 22 toward the wheel 5, and consequently, of the scraper, when the device is tripped upon meeting an unusual obstruction on the wheel.

Figure 4:
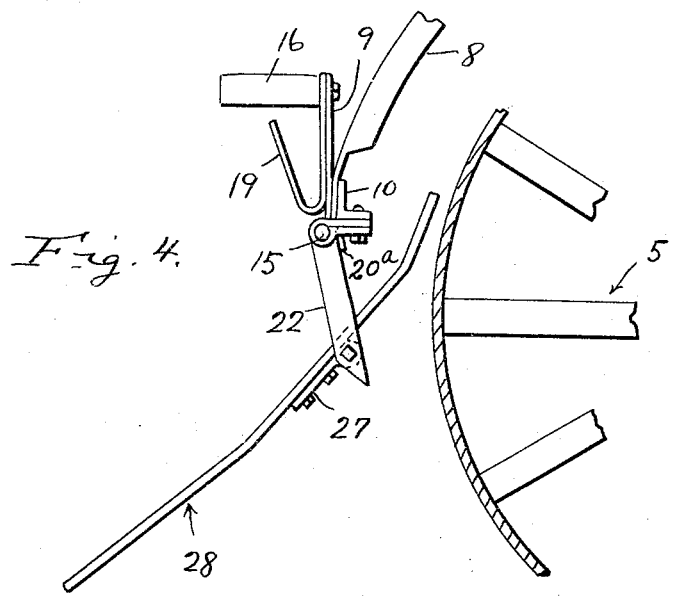
Figure 4 is a view similar to Figure 3 showing the device completely tripped out of operative position.

It is believed obvious from the drawings, that should an unusual obstruction contact the lower end of the scraper bar 28, that the double jointed or hinged relationship of the parts described will permit the scraper bar to be swung by the obstruction as the wheel is rotated, into the completely tripped position shown in Figure 4, whereby the scraper bar is taken out of operation automatically without damage thereto or to the fender or to any part of the tractor.

It is further obvious that as the unusual obstruction is contacted, the lower end of the scraper blade 28 will be carried slightly upwardly. Since the blade when contacted with the wheel in operative position is disposed at an upward and rearward angle, the effect of the upward movement is to swing the hinged members 22 to the rear and upwardly along with the blade. This movement of the blade and members 22 permits the lower end 29 of the blade to be carried along by the obstruction on the wheel sufficiently to draw the upper end of the blade from between the arms of the retainer bracket 16.

Of course, freed from the retainer bracket 16 the long upper portion of the blade swings downwardly under its own weight to the completely tripped position shown in Figure 4. To restore the blade to the operative position shown in Figure 1 or the neutral position shown in Figure 3, the upper portion of the blade is manually lifted upwardly and at the same time away from the wheel until it can be entered between the arms of the retainer bracket 16 so as to be frictionally held thereby, and contacted with the spring 19.

Since various modifications of the device described above may occur to anyone acquainted with the art to which this relates, it is to be definitely understood that I do not desire to limit the application of this invention to the particular modifications set out herein to illustrate the principles hereof, and any change or changes may be made in material and construction and arrangement of parts consistent with the spirit and scope of the invention.

Having thus described my invention, what I claim as new is:

1. A tractor wheel scraper of the type described comprising a fender mounting adjacent one of the wheels of the tractor, a swingable scraper bar carried by the mounting, friction retaining means on the mounting adapted to be engaged by the upper end of the scraper bar for maintaining the scraper bar in positions in or out of engagement with the tractor wheel between ground engaging elements thereof, and means connecting the scraper bar with said mounting which permit the bar to swing bodily out of its normal sphere of action upon its being contacted and moved by an extraordinary obstacle on the wheel, said friction retaining means comprising a member having spring arms which are adapted to be spread by engagement of the scraper bar therebetween whereby the scraper bar is frictionally held.

2. A tractor wheel scraper of the type described comprising a fender mounting adjacent one of the wheels of the tractor, a swingable scraper bar carried by the mounting, friction retaining means on the mounting for engaging the upper part of the scraper bar for maintaining the scraper bar in positions in or out of engagement with the tractor wheel between the ground engaging elements thereof and arranged to release the scraper bar when the same strikes an unusual obstruction on the wheel, and means connecting the scraper bar with the said mounting which permits the bar to swing bodily out of its normal sphere of action upon its being contacted and moved by an extraordinary obstacle on the wheel, said scraper bar being swingably carried at a point below its middle so that its upper end will swing downwardly of its own weight when released from the friction retaining means.

3. A scraper attachment for a tractor wheel comprising bracket means adjacent the tractor wheel, pivoted link means depending from the bracket means, a swingable scraper bar pivotally carried by the lower part of the link means, said link means being connected to the scraper bar at a point below its center of gravity so that the upper part of the scraper bar will normally overbalance the lower part thereof, a friction retaining means carried by the bracket means for releasably holding the upper part of the scraper bar when it is placed therein with its lower end either in or out of engagement with the tractor wheel, whereby upon striking an unusual obstruction on the tractor wheel the scraper bar will be moved out of engagement with said friction retaining means so that its upper part will overbalance and fall and carry the lower part of the scraper bar out of engagement with the tractor wheel.

In testimony whereof I affix my signature.

HENRY TONJES, JR.